April 7, 1942.                H. SILVER                 2,279,016
                          AIR TURBINE VENTILATOR
                    Filed April 12, 1939        2 Sheets-Sheet 1

INVENTOR.
HERMAN SILVER
BY HIS ATTORNEYS.
Williamson & Williamson

April 7, 1942.  H. SILVER  2,279,016
AIR TURBINE VENTILATOR
Filed April 12, 1939  2 Sheets-Sheet 2
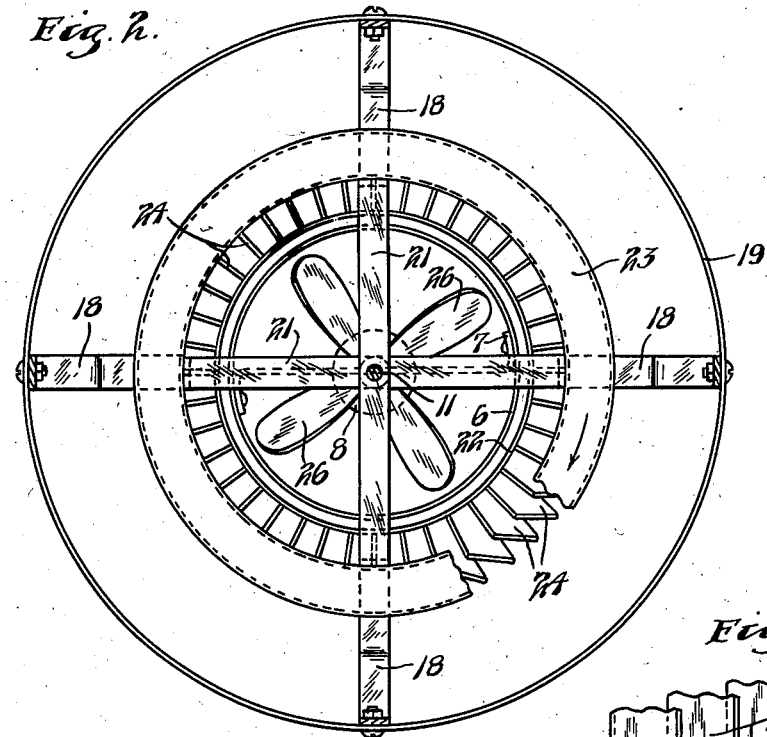
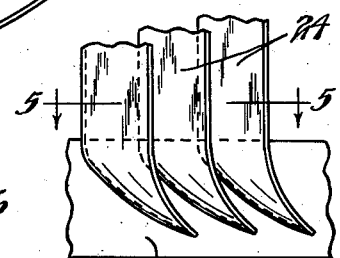
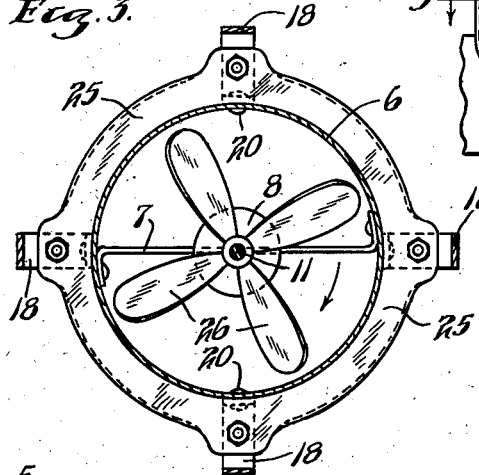
INVENTOR.
HERMAN SILVER.
BY HIS ATTORNEYS.
Williamson & Williamson Patented Apr. 7, 1942

2,279,016

UNITED STATES PATENT OFFICE 2,279,016

AIR TURBINE VENTILATOR

Herman Silver, Minneapolis, Minn.

Application April 12, 1939, Serial No. 267,411

2 Claims. (Cl. 98—72)

This invention relates to ventilating devices such as are used on the roofs of buildings either on a chimney stack or a vent pipe for removing fumes from the building.

One of the objects of my invention is to provide a ventilator which includes a rotary cage-like structure which might be termed a wind turbine to supplement the natural draft of the stack or vent and assist in setting up a flow of air out of the upper end of the stack.

Another object of the invention is to provide an air pump device operated by the rotary wind turbine to additionally assist in creating an upward pull or draft in the stack.

A further object of the invention is to provide a ventilator having a turbine-like rotary cage on a vertical pivot arm, the blades of the turbine cage extending upwardly and outwardly at an angle to increase the upward directional flow of air.

Another object of the invention is to provide a rotary cage which is generally like the well known squirrel cage type of rotary fan and wherein portions of the cage are provided with pockets for entrapping wind and rotating said cage.

Still another object of the invention is to provide a guard device or shield adjacent the upper end of the stack and the lower end of the cage to prevent rain and snow from blowing into the interior of the cage and the upper end of said stack.

Another object of the invention is to provide means for effectively shielding the upper open end of the rotary cage from downwardly moving or laterally moving precipitation.

Still a further object of the invention is to provide a relatively simple and strong bracing structure for supporting the upper shielding devices and the upper end of the turbine cage pivot.

Another object of the invention is to provide an improved lubricating arrangement for the turbine cage pivot.

These and other objects and advantages of the invention will more fully appear from the following description made in connection with the accompanying drawings, wherein like reference characters refer to the same parts throughout the views, and, in which:

Fig. 2 is a horizontal section taken approximately on the line 2—2 of Fig. 1 with a portion of the rotary cage broken away;

Fig. 3 is a horizontal section taken on the line 3—3 of Fig. 1;

Fig. 4 is an enlarged fragmentary view of the lower ends of several of the vanes of the rotary cage showing pockets formed at said lower ends; and Fig. 5 is a horizontal section taken approximately on the line 5—5 of Fig. 4.

Figure 1:
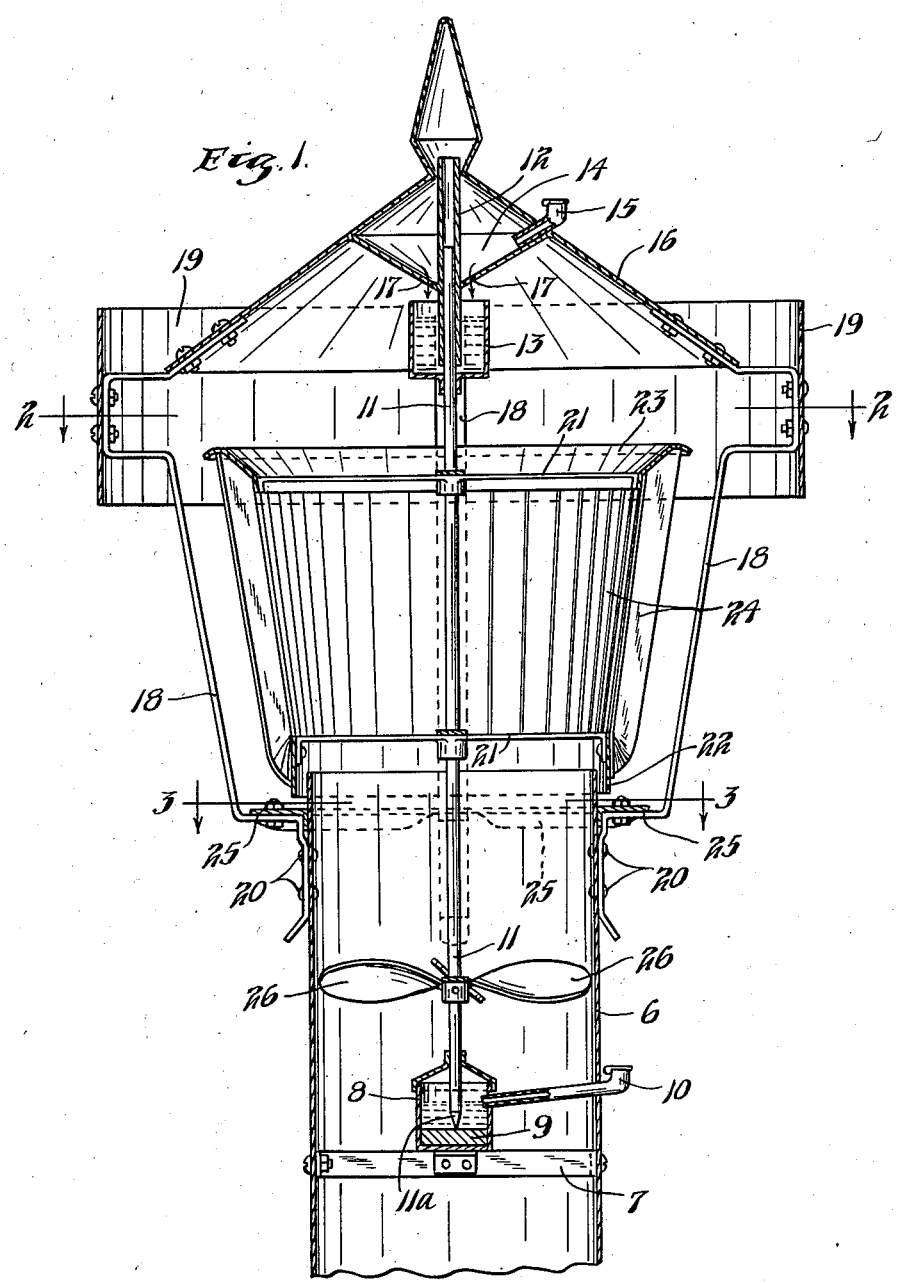
Fig. 1 is a vertical section through a ventilator construction in accordance with my invention.

In Fig. 1 there is shown the upper end of a stack 6 which may be a chimney stack or a ventilator stack extending from a roof of a building. A cross brace 7 is connected across the interior of the stack below the upper end thereof and said brace supports a small container 8 having a relatively hard flat bearing plate 9 positioned therein. The container 8 has a lubricant filler spout 10 extending therefrom out through the side wall of the stack and it will be noted that the upturned outer end of filler pipe 10 is so positioned relative to the container 8 that it is possible to see in the spout to determine when the container has been filled with a lubricant. A central vertical shaft 11 has a lower pointed end 11a which bears against the bearing plate 9 and is immersed in the lubricant. The shaft 11 extends through the top end of the stack 6 and its upper end extends into a sleeve-like bearing 12 which has its end immersed in a body of lubricant in a suitable container 13. The sleeve 12 is connected with a substantially conical brace element 14 and a lubricant filler spout 15 communicates with said conical element 13 through the wall of an inverted cone-shaped shield 16. Lubricant introduced through the filler spout 15 runs through apertures 17 in the smaller inverted cone-shaped sleeve support 14. The outer cone-shaped element 16 is connected to the upper ends of braces 18, the latter extending outwardly from the cone 16 to connect with and support a circular band which is spaced from the edge of the cone 16 as shown in the drawings. The support 18 extends downwardly and is connected to the upper end of the stack by means of rivets 20.

The vertically disposed shaft 11 has a plurality of radially extending arms 21, said arms being arranged in two sets spaced from each other along said shaft 11. The upper set of radial arms 21 as shown in Fig. 1 is longer than the lower set of arms. The lower arms are connected to and support a lower rim 22 whose side wall is substantially vertically disposed and the upper set of radial arms 21 supports a rim 23 of greater diameter than the lower rim 22, said upper rim having its wall lying at an angle as best shown in Fig. 1.

Connected between the rims 22 and 23 is a plurality of vanes or blades 24. As best indicated in Figs. 2, 4, and 5, the blades 24 slant upwardly and outwardly due to the difference in the diameters of the two rims 22 and 23. These blades are also positioned at angles to radii of the two rims 22 and 23. Said rims with their blades and supporting pivot shaft 11 form what might be termed a wind turbine cage, and this cage will rotate in the wind rather easily and with considerable speed due to the lubricated bearings supporting the same. The outwardly and forwardly slanting positions of the blades 24 is important since air directed against the blades will be deflected upwardly along the blades and create an upward flow or current adjacent the top of the stack 6 to materially assist the natural draft of air to the stack. This action is considerably different than if the cage were of uniform diameter from the bottom rim to the top.

The lower ends of the blade 24 are curved inwardly so that edge portions of the ends of the blades meet the substantially vertical wall of the lower rim 22 to form pockets which will catch the wind and increase the rotary action of said turbine cage. It should also be noted that the pockets formed between the lower ends of the blades 24 and the rim 22 have upwardly curved or slanted walls to direct the wind upwardly. The upper ends of the blades 24 connect with the slanting wall of the upper rim 23 to form additional pockets for catching the wind and assisting rotation of the cage.

The cage comprising the rims and blades is positioned as is clearly shown in Fig. 1 with its open upper end beneath the conical shield 16 with the bottom edge of the shield overhanging the open cage top to prevent rain and snow from falling into the cage and down the stack 6. The circular band 19 is spaced outwardly from the lower edge of the shield 16 to permit the flow of air upwardly around the bottom edge of said shield and the circular sleeve-like guard 19 also acts to prevent rain and snow from blowing into the cage at an angle under a relatively strong wind. Practically no precipitation can enter the cage between the blades 24 due to the slight over-lapping relationship of the blades, as best illustrated in Figs. 2 and 4. Only one small portion of the cage will have the blades so presented to the wind that moisture can blow in between them, and the amount so admitted is negligible.

It will be seen in Fig. 1 that the lower cage rim 22 lies concentrically to the upper end of the stack 6 and is slightly spaced therefrom so that the rim will not contact the stack as the cage rotates. Immediately below the bottom edge of the rim 22 and adjacent the open upper end of the stack 6 is a radial flange 25 which is bolted to the upwardly extending braces 18. Those portions of the radial flange 25 between the four points of connection with the braces 18 are slanted downward slightly, as best indicated in Fig. 1, so that moisture will run off of the flange and will not be collected thereby.

The lower portion of the cage pivot shaft 11 which as described above extends into the upper end of the stack 6 has a multiple bladed screw 26 mounted for rotation with the pivot inside of the upper portion of the stack. Upon rotation of the wind turbine cage the pivot shaft 11 and the screw 26 will act as a pump to pull air upwardly through the stack and assist the pumping or flow producing action of said turbine cage.

Thus, even though the natural draft of the stack may not be great a forced draft is produced by the rotary cage with its outwardly and upwardly slanting blades 24 and the air screw 26. However, should there be no wind to rotate the turbine cage my structure will still act as a ventilator and cover for the upper end of the stack 6, and the construction is such that the natural draft in the stack is not materially obstructed. The shield elements 16 and 19 adjacent the upper end of the rotary cage are stationary and in no way connected with the cage so that the latter will rotate with considerable freedom and without any unnecessary drag.

The space between the lower edge of the conical shield 16 and the wall of the sleeve-like shield 19 not only permits an upward flow of air but prevents an accumulation of dirt and also makes it impossible for birds to build nests on the shields.

From the foregoing description it will be seen that I have provided a highly efficient wind actuated ventilating device in which the natural draft of a stack is materially supplemented due to the upward deflection of the wind by the blades 24 and also due to the pumping action of the screw 26. The device is well balanced and the pivot shaft 11 rotates in well lubricated bearings so that there is very little resistance to rotation. It is a structure which can be mounted on the upper end of any usual circular stack and is so constructed that there is nothing to get out of adjustment or to otherwise cause trouble even over extended periods of use.

It will, of course, be understood that various changes may be made in the form, details, arrangement and proportions of the various parts without departing from the scope of my invention.

What is claimed is:

1. In a ventilating device for an opening in an enclosure, a stack communicating with said opening and extending vertically therefrom, a central pivot element positioned axially of said stack and extending upwardly above the top thereof, an open rim supported by said pivot element in a substantially horizontal position, a second open rim of larger diameter than said first mentioned rim and supported by said pivot element in upwardly spaced relation to said first rim, a plurality of spaced vanes extending between said rims and disposed at angles to radii of said rims to provide an open sided turbine cage, an air pumping device adjacent the top of said stack and connected to said pivot element for movement therewith, and a protective cover member disposed upwardly and outwardly from said cage to permit free flow of air axially through said cage and radially outwardly between said vanes.

2. In a ventilating device for a vertical stack having an outlet, a substantially vertically disposed pivot shaft, a pair of open rim members supported by said pivot shaft concentric thereto, one of said rims being substantially the same size as said outlet, the other of said rims being disposed above said first mentioned rim and being of greater size than said first mentioned rim, a plurality of substantially flat spaced parallel vanes having their ends connected between said rims, said vanes being non-radial to said pivot shaft and slanting outwardly from bottom to top to provide, with said open rims, a frusto-conical turbine cage, said vanes having outer faces having a vertical overhang substantially throughout their lengths, whereby currents of air will impinge against said faces as they flow upwardly and outwardly through the wall of said turbine cage, the inner faces of said vanes intercepting lines extending upwardly from said faces, means connected to said pivot shaft for pumping air outwardly through said outlet toward the interior of said cage, means for supporting said pivot shaft and air pumping means in the upper end of said stack and a protector mounted above and outwardly from said cage, the position of said protector permitting free flow of air through said cage rims axially thereof and also through said wall between said vanes.

HERMAN SILVER.